US010017106B2

(12) United States Patent
Cotter et al.

(10) Patent No.: US 10,017,106 B2
(45) Date of Patent: Jul. 10, 2018

(54) CELL PHONE TEXTING EXTERNAL MONITORING APPARATUS AND METHOD

(71) Applicants: William D. Cotter, Fairfield, CT (US); Mark D. Lorusso, Portsmouth, NH (US)

(72) Inventors: William D. Cotter, Fairfield, CT (US); Mark D. Lorusso, Portsmouth, NH (US)

(*) Notice: Subject to any disclaimer, the term of this patent is extended or adjusted under 35 U.S.C. 154(b) by 0 days.

(21) Appl. No.: 15/173,636

(22) Filed: Jun. 4, 2016

(65) Prior Publication Data

US 2016/0355122 A1 Dec. 8, 2016

Related U.S. Application Data

(60) Provisional application No. 62/170,914, filed on Jun. 4, 2015.

(51) Int. Cl.
| B60Q 1/00 | (2006.01) |
|---|---|
| B60Q 1/50 | (2006.01) |
| G06K 9/00 | (2006.01) |
| H04W 4/02 | (2018.01) |

(52) U.S. Cl.
CPC ............ B60Q 1/50 (2013.01); G06K 9/00832 (2013.01); H04W 4/02 (2013.01); *B60Q 1/0035* (2013.01)

(58) Field of Classification Search
CPC ......... H04M 1/72577; H04M 1/72569; H04W 48/04; H04W 4/02; B60K 28/02; B60Q 1/50; G06K 9/00832

USPC ........ 340/439, 468, 471, 472; 455/418, 419; 701/51, 52
See application file for complete search history.

(56) References Cited

U.S. PATENT DOCUMENTS

| 9,042,872 | B1 * | 5/2015 | Breed ............... | H04M 1/72577 455/414.1 |
|---|---|---|---|---|
| 2009/0085728 | A1 * | 4/2009 | Catten .................... | H04K 3/415 340/425.5 |
| 2011/0063098 | A1 * | 3/2011 | Fischer ............. | G07C 9/00119 340/439 |
| 2011/0294465 | A1 * | 12/2011 | Inselberg .......... | H04M 1/72577 455/410 |
| 2012/0088462 | A1 * | 4/2012 | Mader ................ | H04M 1/6075 455/161.1 |
| 2014/0018993 | A1 * | 1/2014 | Kindo ................. | G05D 1/0061 701/23 |

(Continued)

FOREIGN PATENT DOCUMENTS

JP 2016005932 A * 1/2016

*Primary Examiner* — Thomas Mullen
(74) *Attorney, Agent, or Firm* — Lorusso & Associates

(57) ABSTRACT

An apparatus and method for monitoring and discriminating cell phone use (voice and text) in a vehicle from the exterior of the vehicle is provided. Cell phone use indicator lights are positioned on the exterior of a vehicle and wirelessly connected to or hardwired to cell phone use detection sensors located in seats and/or within the vehicle cabin to provide site specific information about specific cell phone use in the vehicle based on radio wave frequencies emitted by one or more cell phones in use in the vehicle. One or multiple indicator lights grouped in cluster arrangements to simulate the seat arrangement in a vehicle can be implemented. The apparatus may also be used in aircraft to monitor passenger electronic device use remotely from within the aircraft.

25 Claims, 24 Drawing Sheets

(56) References Cited

U.S. PATENT DOCUMENTS

| | | | |
|---|---|---|---|
| 2015/0054639 A1* | 2/2015 | Rosen | G06K 9/00785 340/439 |
| 2015/0087223 A1* | 3/2015 | Cadigan | H04K 3/415 455/1 |
| 2016/0096530 A1* | 4/2016 | Catania | B60W 40/08 701/51 |

* cited by examiner

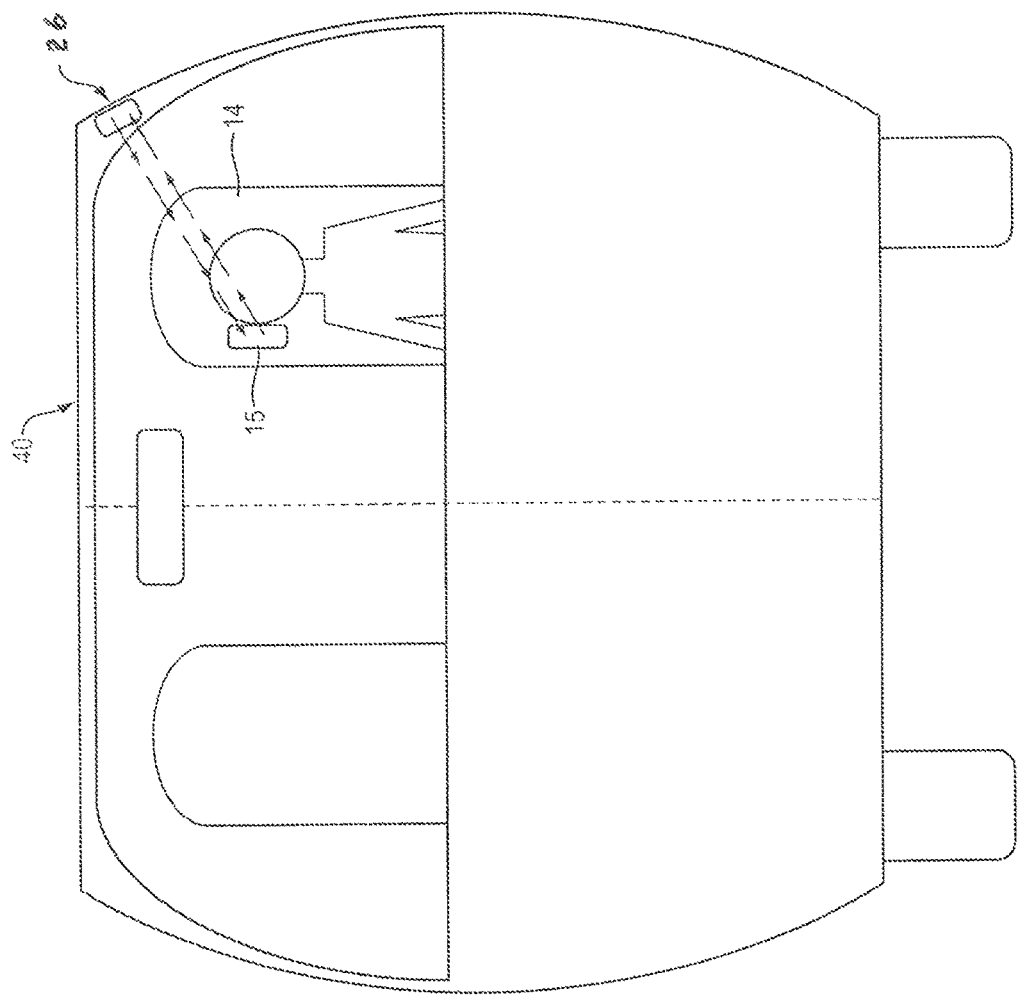

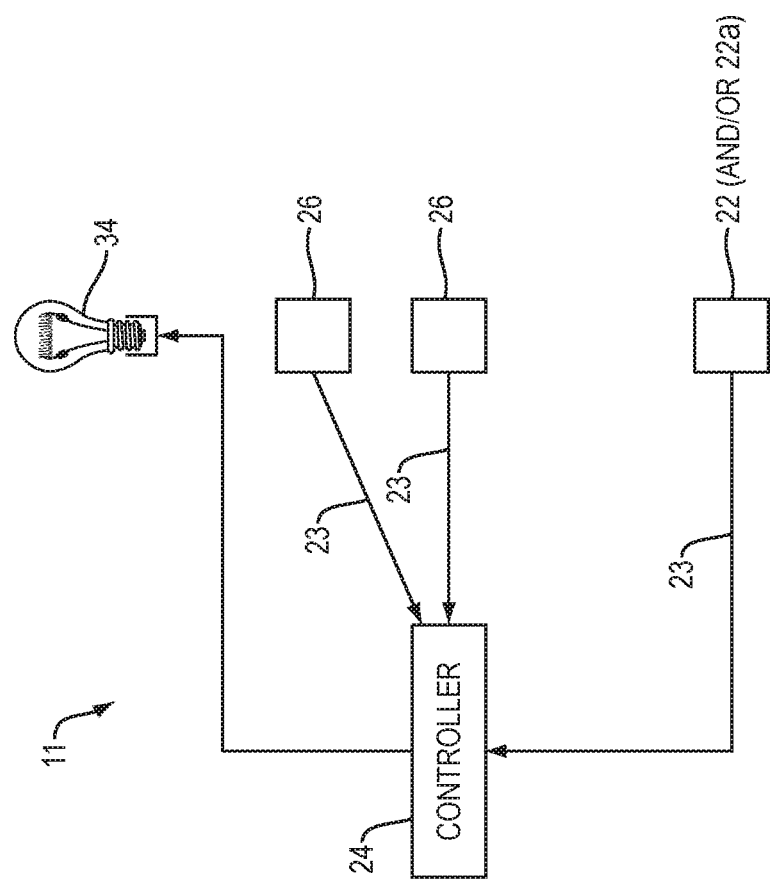

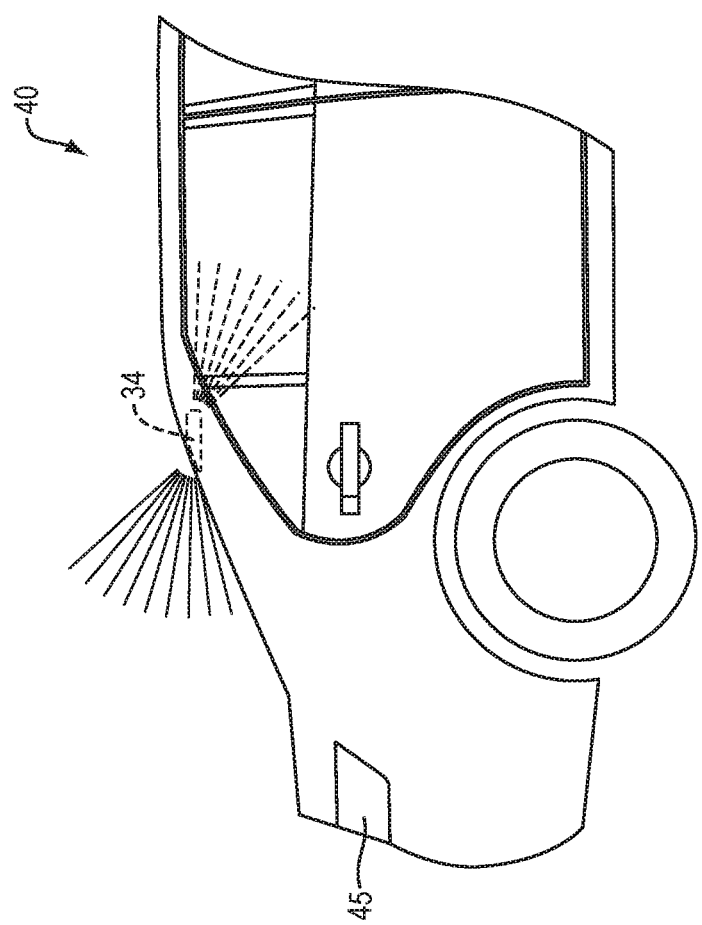

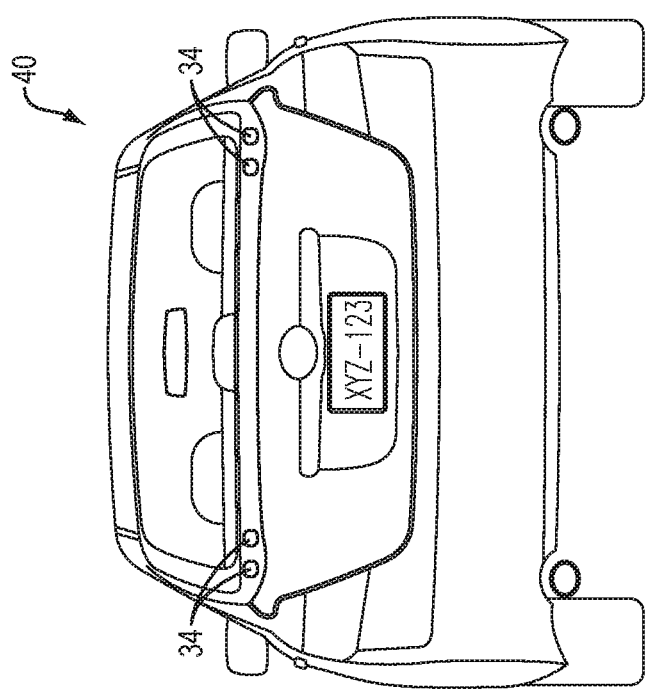

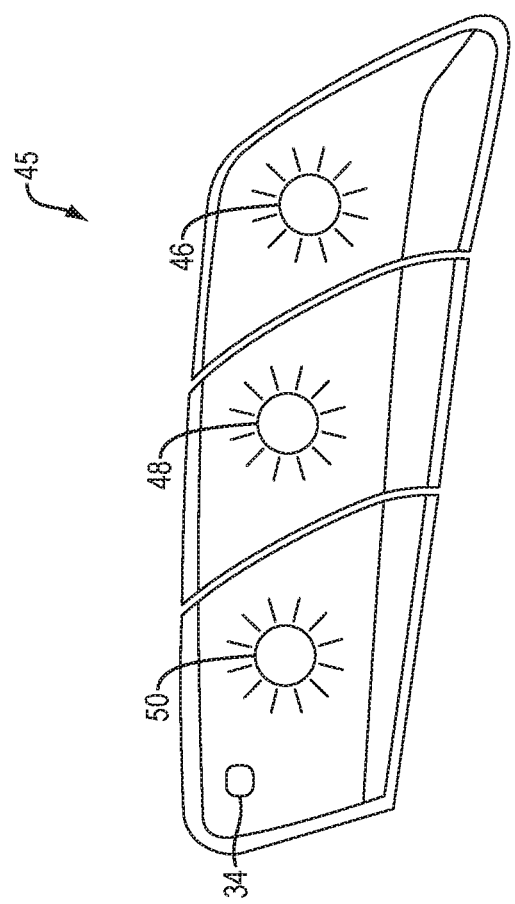

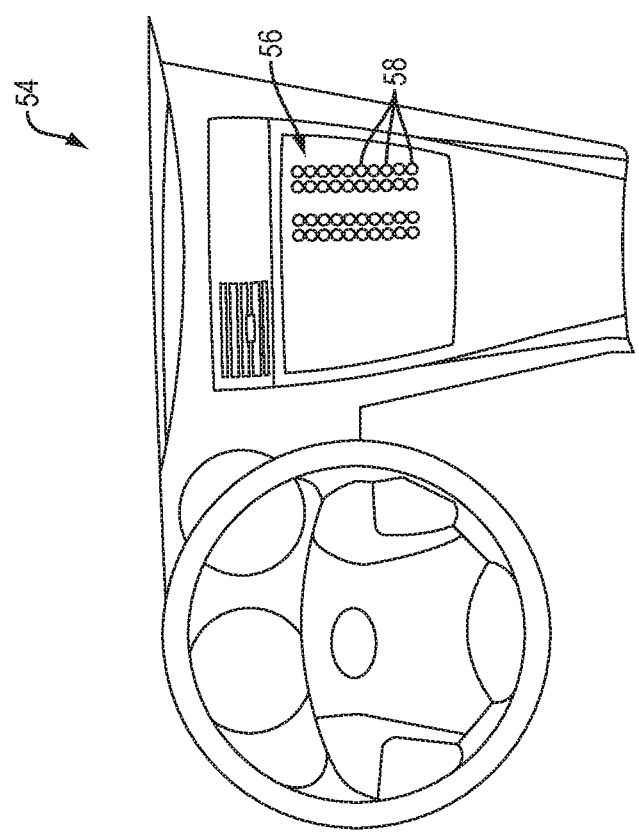

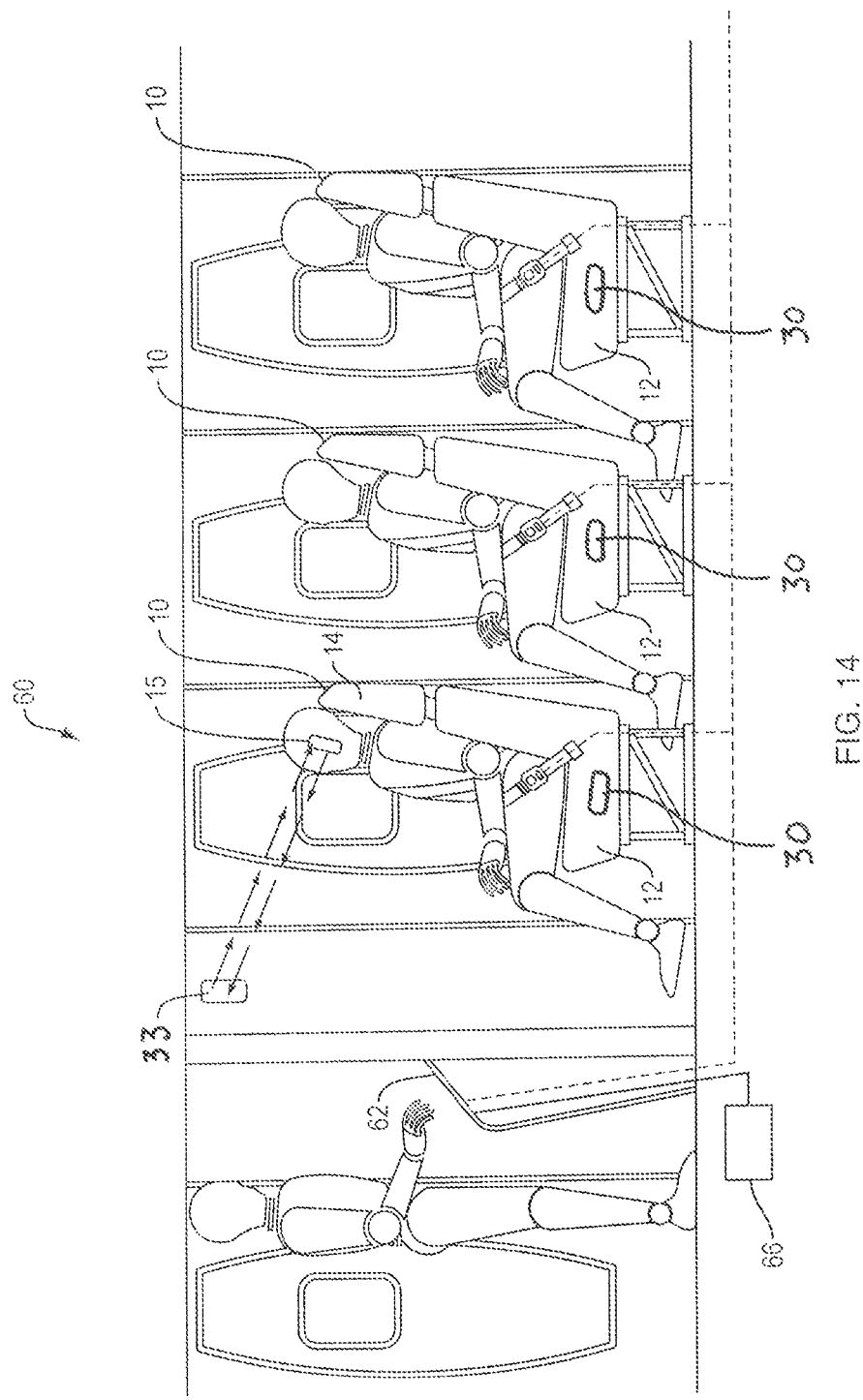

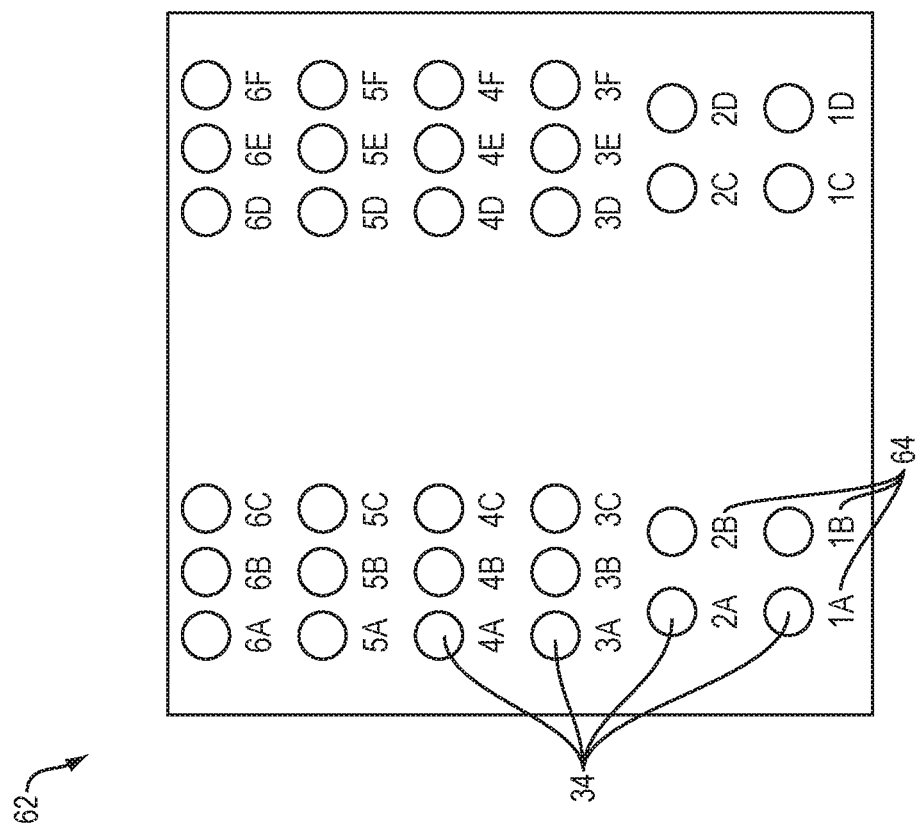

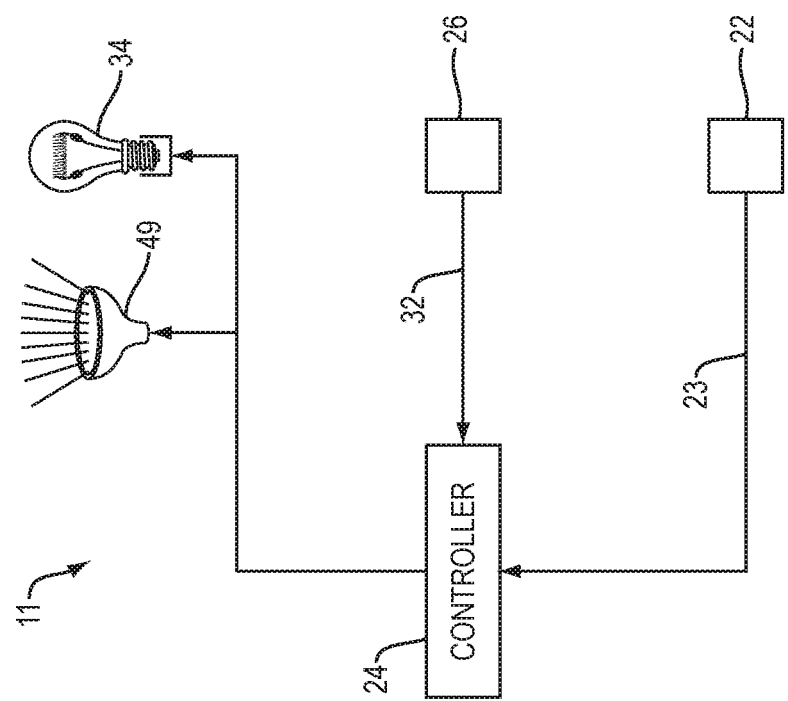

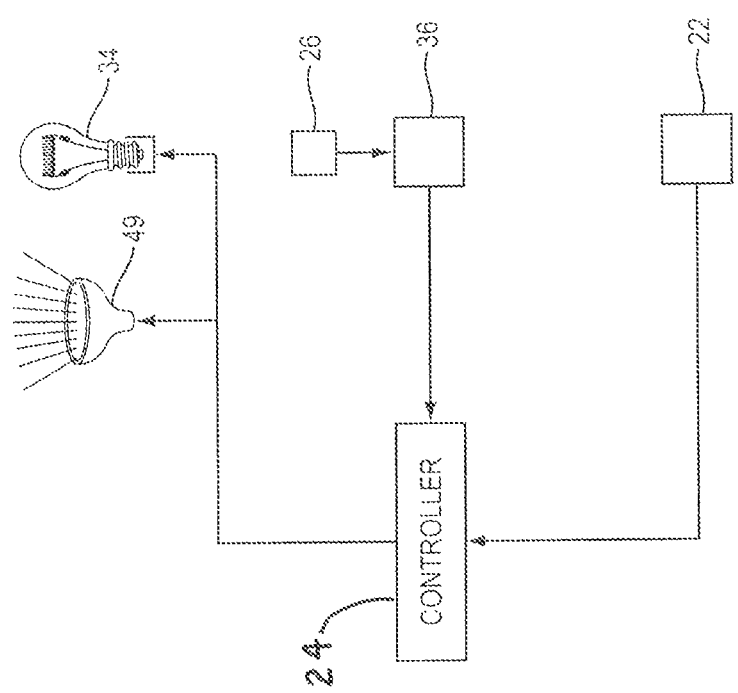

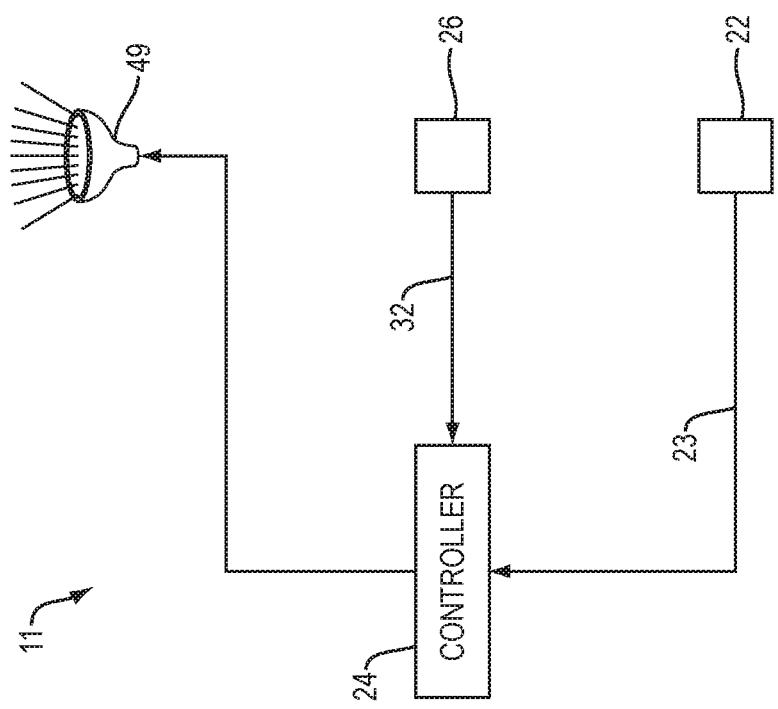

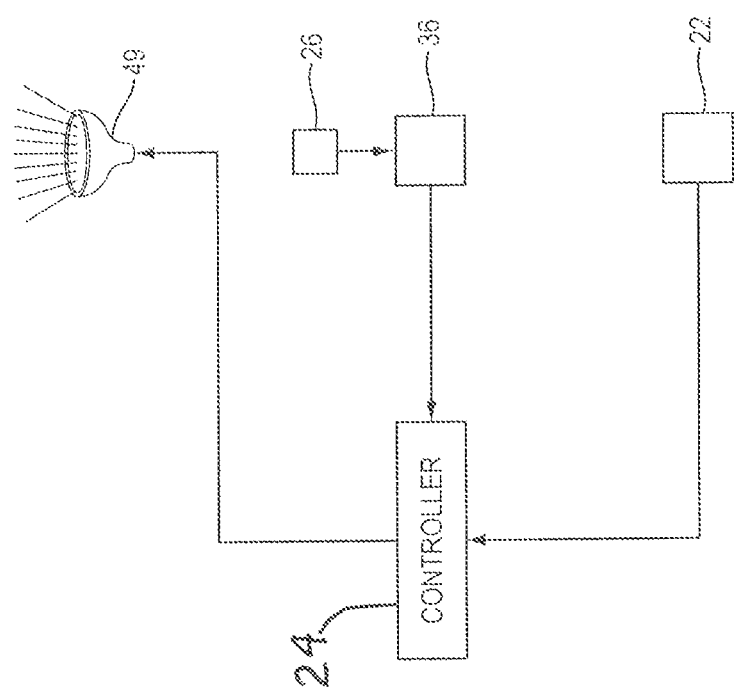

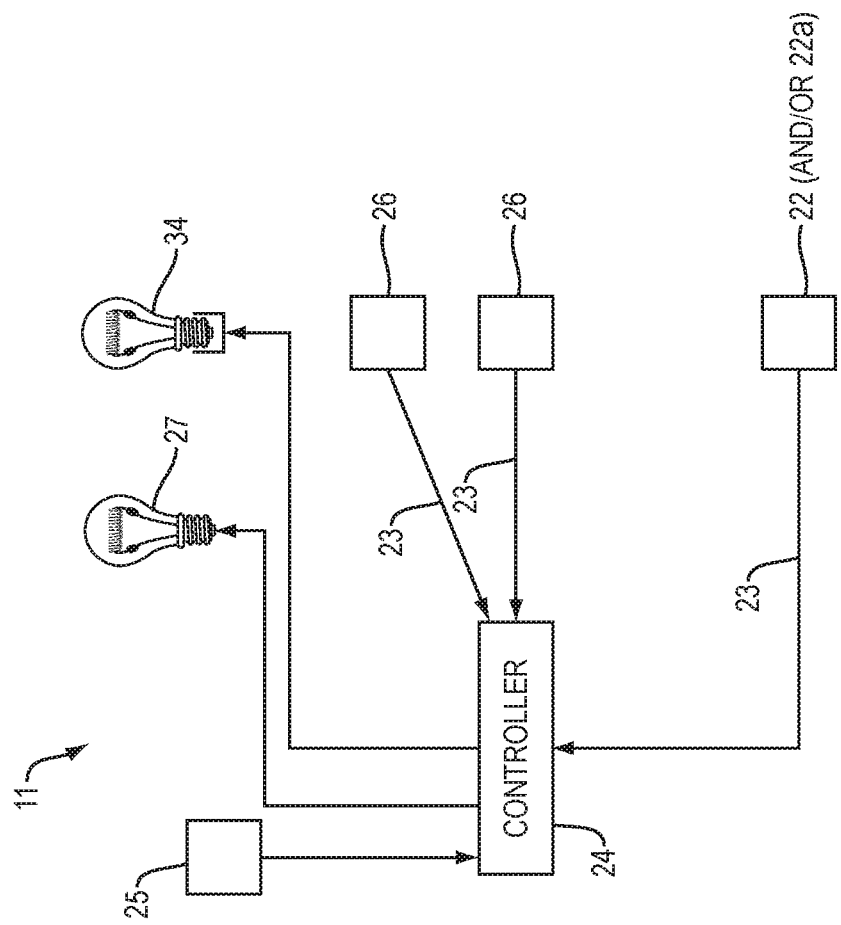

CELL PHONE TEXTING EXTERNAL MONITORING APPARATUS AND METHOD

CROSS REFERENCE TO RELATED APPLICATIONS

This regular utility application claims the benefit of U.S. Provisional Application Ser. No. 62/170,914, filed Jun. 4, 2015, the contents of which are incorporated herein by reference.

FIELD OF THE DISCLOSURE

The present disclosure relates to a method and apparatus for monitoring the use of cell phones for calling and texting in all types of motorized vehicles. More particularly, the present disclosure relates to a method and apparatus for monitoring from the exterior of a motor vehicle, cell phone calling and texting in the vehicle.

BACKGROUND OF THE DISCLOSURE

According to the Governor's Highway Safety Association, as of August, 2014, 44 states, Washington, D.C., Puerto Rico, Guam and the U.S. Virgin Islands ban texting for all drivers. At least thirty-eight states and D.C. ban all cell phone use by novice drivers. Fourteen states, D.C., Puerto Rico, Guam and the U.S. Virgin Islands prohibit all drivers from using hand-held cell phones while driving. These fourteen states and protectorates have all made these prohibitions primary enforcement laws that permit law enforcement to cite individuals in violation of these laws without any other offenses. The NHTSA further estimates that if the compliance rate were increased to 90%, 5,536 fatalities and 132,670 injuries could be avoided.

A problem faced by all law enforcement officials is a diminished ability to ascertain whether the occupants of a moving vehicle are in compliance with state texting laws. Automobiles come in a wide variety of shapes and sizes and window tints that make texting monitoring very difficult. Often times, when a law enforcement officer approaches the driver of a vehicle pulled over for a traffic violation, the driver has already stopped any cellphone use and has even secreted away the phone—an easy task for a small, easily concealed device.

To Applicants' knowledge, apparatuses are under development that permit law enforcement officers to monitor cell phone use in moving vehicles by detecting the telltale radio wave frequencies emitted by cell phones. The devices in question are similar in appearance to radar detectors. An officer points the device toward a vehicle to ascertain whether a cell phone is being used in the vehicle. Whether or not the cell phone use detection device works as intended, there is a significant problem associated with such a device. The device is supposed to detect cell phone use generally, but cannot determine the exact location of the use in a vehicle. For example a backseat passenger using a cell phone would be detected the same as a driver using a cell phone. Because state laws differ considerably with respect to what kind of use can be made of a cell phone in a vehicle and by whom (driver and/or passenger), the device may lead to significant Fourth Amendment search and seizure problems for police forces. Unlawful use in one jurisdiction may be lawful in another and there is no current way to distinguish cell phone use by a driver versus use by a passenger. There is also no way currently to distinguish voice calls from texting events in real time.

There is no way to provide seat-specific cell phone use information other than through visual verification. There is no way to distinguish whether the use in a particular seat concerns a voice call or texting. No device, to the knowledge of the applicants, provides cell phone use status information outside the vehicle that is seat-specific. What is needed and desired is a system to monitor cell phone use by the driver and/or the other vehicle occupants from the exterior of a vehicle with sufficient detail to determine precisely where in the vehicle there is cell phone use activity. What also is needed and desired is a cell phone use detection system that can distinguish between voice calls and texting, and provide information about that use outside the subject vehicle.

SUMMARY OF THE DISCLOSURE

In one aspect of the disclosure, a cell phone use monitoring system includes one or more sensors to detect cell phone use. The sensors detect the frequency of a transmission signal generated by a cell phone. In a single sensor embodiment, a single sensor is set in a vehicle in an asymmetrical location to pinpoint and determine three-dimensional location of a cell phone in use. In a multiple sensor embodiment, at least two sensors are placed spaced apart in a vehicle to detect cell phone use. The use of two sensors permits the use of triangulation to pinpoint the location of a cell phone in use. As used herein, cell phone shall mean any electronic device, e.g., smart phones, smart watches, tablets, handheld computers and the like, that can transmit and/or receive voice calls and/or text messages and/or data such as emails.

With either a single detector or multiple detector system, the system can detect multiple cell phones in use. For purposes of system operation, the vehicle is divided into 3-dimensional volumes or cubicles with each cubicle associated with a single seat location in the vehicle. The system determines the cell phone location and then determines in which cubicle the phone is located when in use. The system then determines via radio frequency, or other cell phone use distinguishing characteristic, if the transmission being detected is a voice call, data transfer, or a text message. If a voice call is detected in the driver cubicle, a signal is sent to an exterior light that designates a voice call use by the driver. The signal may be simply an activated light, or a specific color of light with a designated meaning. If a text message is detected, a signal is sent to an exterior light that designates texting, again via light activation, or activation of a specific color of light. In an alternative embodiment, an un-activated light can designate cell phone use, voice and/or text.

In another aspect of the disclosure, the cell phone voice and texting monitoring system includes one or more exterior lights positioned on the exterior of a vehicle. The one or more lights can be directly connected to cell phone use detection device(s) positioned in one or more locations in the vehicle. Alternatively, the light(s) can be connected to a central processing system that uses information received from cell phone operation detection devices to control operation of the exterior light(s).

The system alters exterior light activation events if Bluetooth technology is present and operational. For voice calls that utilize Bluetooth connectivity, including those that use headphones, the system does not send a signal to activate an exterior light as voice calls can be made hands-free. Alternatively, for configurations that include a colored light to designate proper use, the exterior light may be activated. In a further alternative embodiment, a specific color light may be used to designate a voice call using Bluetooth connectivity while a differently colored light may designate a voice call being made without Bluetooth connectivity. In a further embodiment, for self-driving or fully automated vehicles, the system may incorporate a separate light, or use a different color for an existing vehicle light to designate full auto mode, or driver-assisted mode along with detection of cell phone use. The automation mode is determined by a mode detector 25, a tripped switch when changing from one mode to the other, or a similar detection method. The detector sends a signal to a controller that next sends a signal to a mode light or to another light on the exterior of the vehicle. The mode light may also be activated directly by the detector.

For text messaging, again determined via frequency discrimination, (or other cell phone use discriminating characteristic), Bluetooth connectivity does not eliminate the sending of a violation signal to the exterior light(s) (activated with or without a designated light color) as Bluetooth connectivity does not eliminate the need for a person texting to observe the cellphone or other electronic device while typing the text. The signal sent is seat specific to indicate a texting event in the driver's cubicle, or some other cubicle. In an alternative embodiment, a particular color light is used to designate texting without Bluetooth connectivity while a differently colored light is used to designate texting with Bluetooth connectivity in the event such texting is permitted by one or more states. The system may also incorporate the auto mode, or driver assisted mode feature for text messaging.

In another aspect of the disclosure, the exterior lights are wirelessly connected directly, e.g., via radio frequency communication, to either the cell phone use detection device or to the central processing system. The lights can be configured to light when a cell phone is being used to text, or when no cell phone use is detected. The light configurations, colors and functional settings can be adjusted and/or modified to conform to prevalent federal and state laws and regulations.

In another aspect of the disclosure, a single light is provided on the exterior of a vehicle to indicate whether the driver, or any of a plurality of vehicle occupants is using a cell phone for a voice call, or for texting. In yet another aspect of the disclosure, a plurality of lights is provided in a cluster arranged to correspond to the vehicle's seat arrangement so that cell phone use in a defined cubical area for each seat can be monitored with specificity. Each light in the cluster is dedicated to a specific seat.

To eliminate the possibility of a false or incorrect indication of texting by the driver, each seat is provided with a sensor that sends a signal to a central processing system to indicate seat occupancy status. The received seat occupancy status signal(s) is/are compared to the signal(s) indicating from which seat cubicle(s) the cell phone is being used. This ensures that the detection of cell phone use in a particular seat cubicle can be correctly attributed to the seat occupant before a signal is sent to an exterior light. Once a match is made, a signal is sent to the exterior light(s) assigned to the seat cubicle(s) from which the cell phone use has been detected. The system is structured to continually activate (or deactivate) the light(s) until cell phone use is no longer detected.

In a further aspect of the disclosure, aesthetically pleasing designs may be employed to complement the light packages currently used on vehicles. Alternatively, specific symbols may be employed to comply with any federal, state and/or local laws and/or regulations. There may be only one light to indicate a violation or a cluster of lights that specify which seat occupant(s) is/are out of compliance.

In a further aspect of the disclosure, a cell phone monitoring system is applied to the seats of an aircraft (private, commercial passenger, or military), and connected to a central monitoring console whereby the aircraft crew can monitor cell phone (or other electronic device) usage. These and other aspects of the disclosure will become apparent from a review of the appended drawings and the detailed description.

BRIEF DESCRIPTION OF THE DRAWINGS

FIG. 1*c* is a front elevational view of a passenger-occupied seat and cell phone use detection system according to another embodiment of the disclosure.

FIG. 2 is a schematic illustration of a vehicle cell phone use detection system including an external indicator light according to one embodiment of the disclosure.

FIG. 6B shows a side view of the rear portion of a vehicle with the cell phone use light positioned in the upper field of the rear window according to a further embodiment of the disclosure.

FIG. 6C shows a trunk portion of a vehicle with the cell phone use lights positioned above the trunk lid according to a still further embodiment of the disclosure.

FIG. 11 shows an automobile tail light assembly with a cell phone use status light integrated into the assembly according to an alternate embodiment of the disclosure.

FIG. 13 shows a school bus dashboard according to an embodiment of the disclosure.

FIG. 14 shows a partial sectional view of an aircraft cabin with a cell phone monitoring system, signals in phantom, according to an embodiment of the disclosure.

FIG. 15 shows an aircraft cell phone monitoring console according to an embodiment of the disclosure.

FIG. 16 is a schematic illustration of a vehicle cell phone use detection system including an external indicator light and integrated horn according to one embodiment of the disclosure.

FIG. 17 is a schematic illustration of a vehicle cell phone use detection system including an external indicator light and integrated horn according to another embodiment of the disclosure.

FIG. 18 is a schematic illustration of a vehicle cell phone use detection system including an externally audible indicator horn according to one embodiment of the disclosure.

FIG. 19 is a schematic illustration of a vehicle cell phone use detection system including an externally audible indicator horn according to another embodiment of the disclosure.

FIG. 20 is a schematic illustration of a vehicle automated mode indication system including an external mode indicator light according to yet another embodiment of the disclosure.

DETAILED DESCRIPTION OF THE DISCLOSURE

Figure 1:
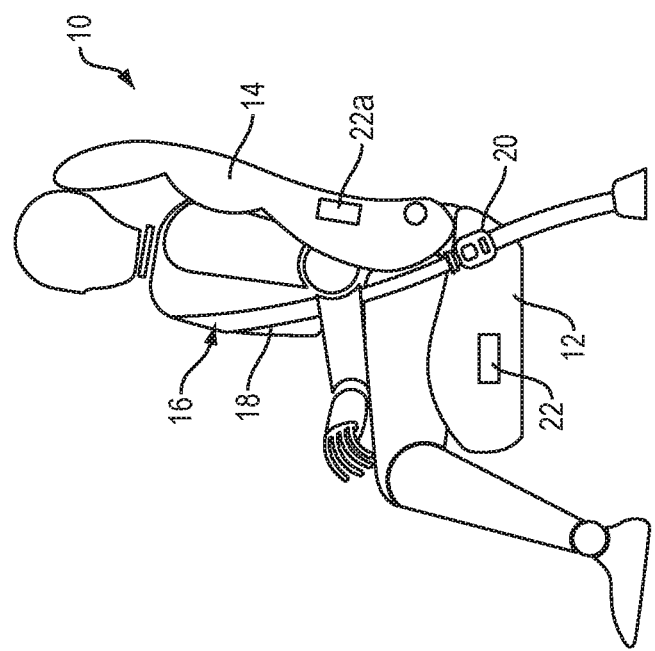
FIG. 1 is a side sectional view of a passenger-occupied seat and a cell phone use detection system according to one embodiment of the present disclosure.
Figure 1A:
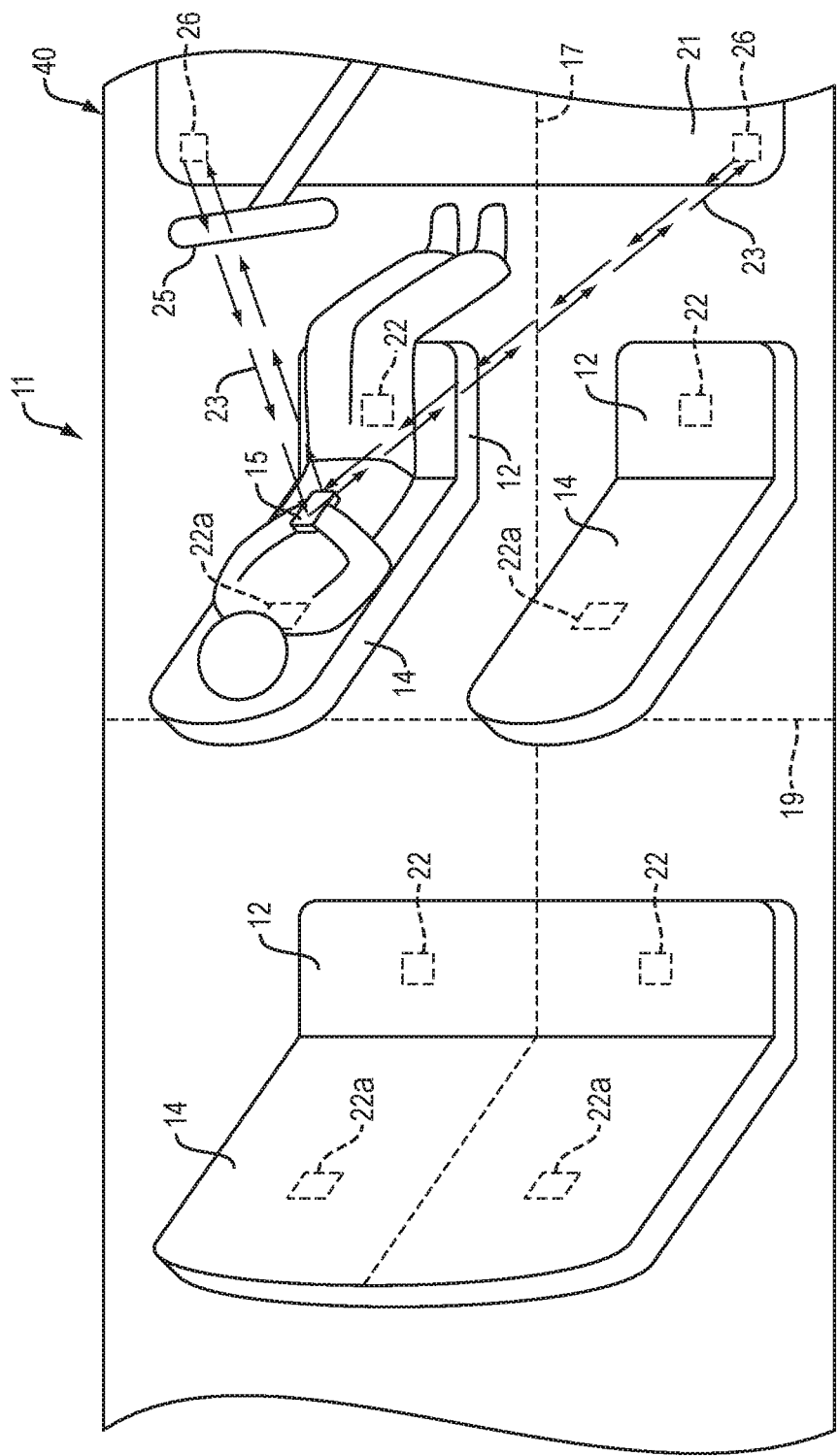
FIG. 1*a* is a top perspective view of the passenger-occupied and cell phone use detection system shown in FIG. 1.
Figure 1B:
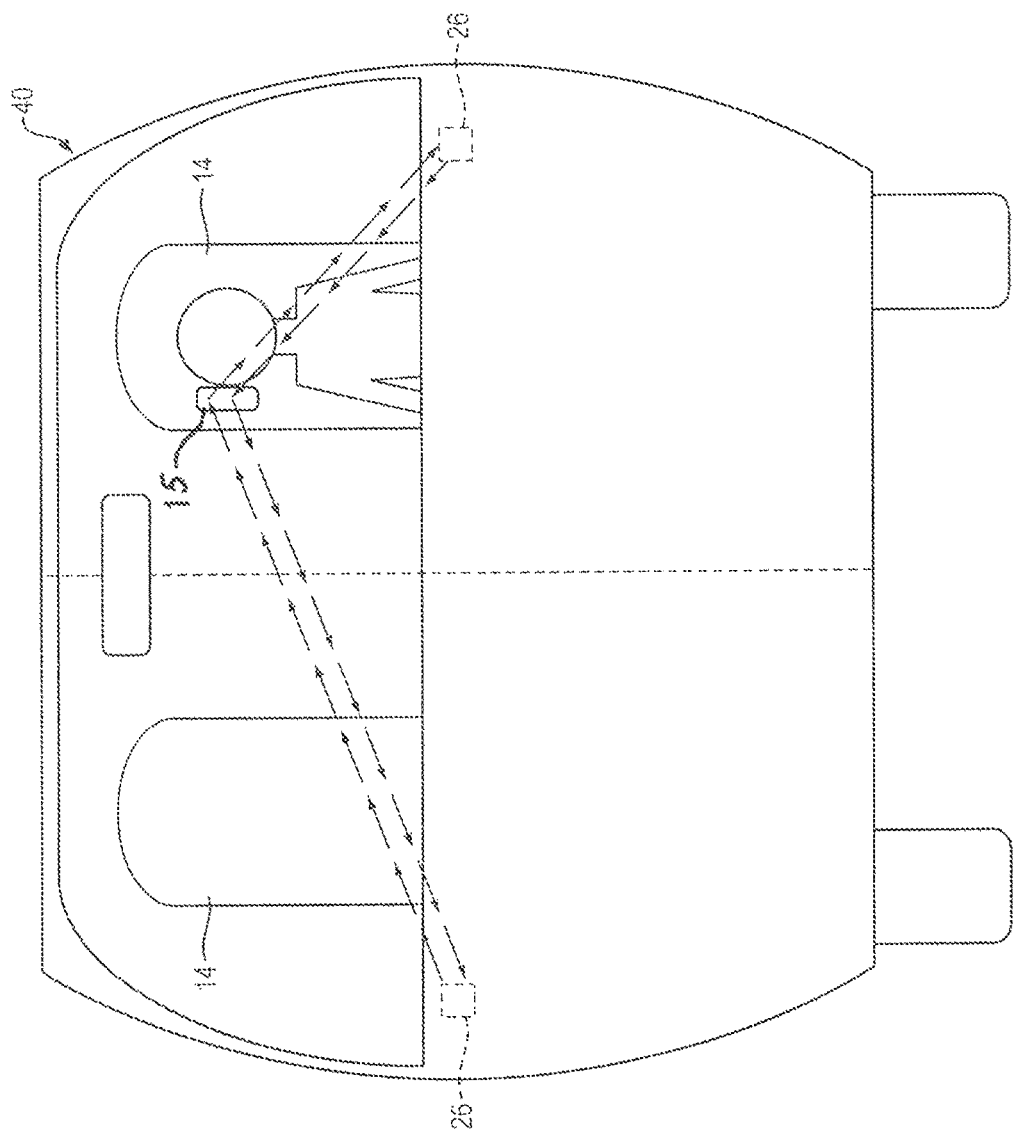
FIG. 1*b* is a front elevational view of the passenger-occupied and cell phone use detection system shown in FIG. 1.

Referring to the drawings and, in particular, FIGS. 1-1c, in one aspect of the disclosure, a vehicle seat assembly for an automobile is shown designated generally as 10. Seat assembly 10 includes a seat 12 connected to a back rest 14. An extendable and retractable seat belt 16 is appended to seat assembly 10 and includes a seat belt strap 18 and a buckle 20.

In one aspect of the disclosure, embedded in seat 12 is a sensor 22 that detects force being exerted on seat 12 in the form of downward pressure derived from placement of an object or person on seat 12. Sensor 22 may be calibrated to detect a specific range of weights representative of the downward pressure sensed or may be configured to detect any pressure above a threshold level, which may be as low as 0.

In an alternate aspect, an infrared sensor 22a is used to detect the presence of a person as opposed to an inanimate object in a seat. Infrared sensor 22a may be incorporated into seat 12, seat back 14, seat belt 16, or placed in a section of the automobile adjacent to the seat to which the sensor is associated, such as the dashboard 17 for the front seats. As an illustrative non-limiting example, with respect to a right back passenger seat in an automobile, infrared sensor 22a associated with that seat may be placed in the seat back portion 14 of the right front seat and focused toward the right back seat to detect occupancy of that rear seat. As with the pressure sensor, the infrared sensor sends a signal via hardwire or wirelessly to a central controller 24 (shown in FIG. 2 described below) for coordination with the cell phone use detection system. As should be understood, any type of sensor may be used that can detect the presence of a human being in a particular seat and remain within the scope and spirit of the disclosure.

Referring to FIG. 2, a cell phone use monitoring system designated generally as 11 is shown. System 11 includes two spaced cell phone use detection sensors 26 that send signals 23 to controller 24. The signals sent to controller 24 are processed by the controller to determine via triangulation, the exact three-dimensional location of the cell phone (designated 15) used in the vehicle. The location is compared to pre-determined three-dimensional spaces associated with, and assigned to, each seat. By comparing the location of the detected cell phone used to the designated seat areas, the system can ascertain within which seat area the cell phone is being used. This information is next compared to the seat status information to verify that the seat area from which the cell phone signal is emanating is occupied. As used herein, "seat status" shall mean the condition of a vehicle seat as being occupied or unoccupied. Controller 24 may be a computer, microprocessor, a set of integrated circuits or a series of separate components, each of which performs one or more functions to determine whether a seat is occupied, a cell phone is being used, in what seat area the cell phone is being used and whether the use is voice or text.

Referring to FIGS. 1-1C, cell phone use monitoring system 11 includes at least two of the frequency detection sensors 26 although more may be incorporated into the vehicle to better pinpoint the cell phone use. The frequency detection sensors are tuned to detect the multiple different radio frequencies used for voice calls, data transmission, texting, voice-to-text, etc. Multiple phones in simultaneous use can be tracked as each will have a unique three-dimensional position in the vehicle. Moreover, multiple paired sets of cell phone use detection sensors may be positioned in various areas of the vehicle cabin to selectively monitor use in particular areas of the cabin. Alternatively, sensors can be installed that are each dedicated to a single seat to monitor cell phone usage in the designated seat. This would eliminate the need for one set of sensors to determine the location of multiple cell phones being used simultaneously in the cabin.

In an alternative embodiment as shown in FIG. 1c, a single frequency-detection sensor 26 is placed in an asymmetric position (or symmetrical position) to detect the location(s) of cell phone use. By placing the sole sensor in an asymmetric position, each three-dimensional point in the vehicle is unique. For example, if the sensor is positioned at the juncture of the vehicle roof and top of the left A pillar, every three-dimensional point that is part of a seat cubicle, will have a unique set of three-dimensional coordinates if the sensor position is used as the point of origin on a three-dimensional scale. The sensor receives signals from the cell phone(s) in use and those signals are sent to the vehicle's processor/controller 24 that determines the precise location of the cell phone within the vehicle and differentiates the radio frequency to determine the type of use being made of the cell phone, e.g., voice call, data transmission, texting, voice-to-text, etc.

In a yet further aspect of the disclosure, a system shut-off is included to deactivate the detection system when the vehicle is a fully automated version that can operate without driver input. The vehicle can manually or automatically toggle back and forth between activation and deactivation depending upon whether the vehicle is in full automatic mode, or overridden and manually operated by the driver. The system can also be configured to shut down when the vehicle transmission system is in the gear selector park position. The system can also include a dedicated light, or light panel on the exterior of the vehicle that is activated to signal the vehicle's operational status as either being in fully auto mode, or driver-assisted mode. As shown in FIG. 20, for self-driving or fully automated vehicles, the system may incorporate a separate light 27, or use a different color for an existing vehicle light to designate full auto mode, or driver-assisted mode along with detection of cell phone use. The automation mode is determined by a mode detector 25, a tripped switch when changing from one mode to the other, or a similar detection method. Detector 25 sends a signal to controller 24, which sends a signal to mode light 27 or to another light on the exterior of the vehicle. Mode light 27 may also be activated directly by detector 25. A vehicle in full auto mode or driver-assisted mode may be indicated by mode light 27 or other vehicle exterior light by being activated or deactivated. If the mode light is activated, it may be activated with a predetermined color to signify full auto mode, or driver-assisted mode.

Once a sensor detects a cell phone in use, a signal 32 is sent via hardwire, or wirelessly, to controller 24 that includes information about the frequency of the detected signal. This information is processed by controller 24 to determine if the signal is a text, voice, or other type of signal based on standardized frequency values set by the cell phone companies and preprogrammed into the controller. This is then compared to seat status information received from sensors 22 to verify the seat area is occupied. If a seat is occupied and cell phone use is detected in the corresponding seat area, controller 24 activates (either via hard wire or wirelessly as described below) an exterior light 34. Exterior light 34 may have one of two settings, each with two optional meanings: on, which can signify that a cell phone is, or is not, in use, and off, which can signify that a cell phone is, or is not, in use. Optionally, a vehicle may include an additional switch to enable a user, or an automotive mechanic, to deactivate the cell phone monitoring system. The switch may be incorporated into the functions of controller 24 and allow for the selective deactivation of one or more seats.

The entire system may also incorporate vehicle operation status into the determination whether to activate the voice/text detection external light. If the vehicle is in park, or stopped, the cell phone use detection system can be placed in a hold mode and not activate any cell phone use detection light. Alternatively, different light color schemes may be used to indicate cell phone use that occurs when a vehicle's gear selector is in a park, or the vehicle is in a stopped condition. If the park, or stopped condition happens during a continuing cell phone use event, light activation (or non-activation), may be continued for a set period of time after the park or stop event, e.g., 60 seconds, to indicate cell phone use during a vehicle moving event as disclosed in more detail below.

Figure 3:
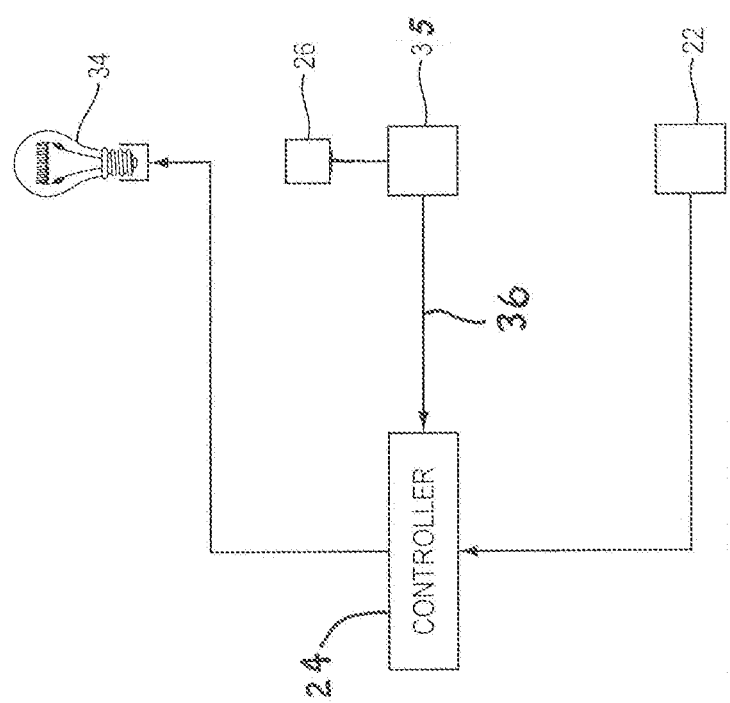
FIG. 3 is a schematic illustration of a vehicle cell phone use detection system including an external indicator light according to a wireless embodiment of the disclosure.

In an alternate aspect as shown in FIG. 3, cell phone use sensor 26 is wirelessly connected to controller 24 via Bluetooth 36, RF or other wireless protocol as is known in the art. In this aspect, a transmitter 35 is connected directly to sensor 26 such that the transmitter sends a signal to a receiver and antenna assembly (not shown) in controller 24.

The same configuration may be used to wirelessly connect controller 24 to light 34. Light 34 is connected directly to the vehicle's electrical system and may include a switch local to the light for activation. The signal received from controller 24 operates the switch. Alternatively, the switch may be located remotely from the light, including integrated with controller 24.

Figure 4:
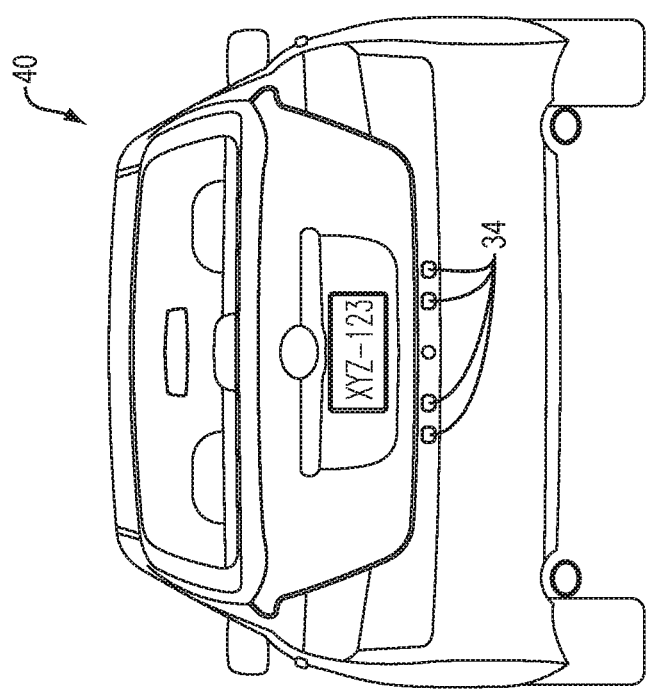
FIG. 4 shows a trunk section of a vehicle with cell phone use lights according to one embodiment of the disclosure.
Figure 5:
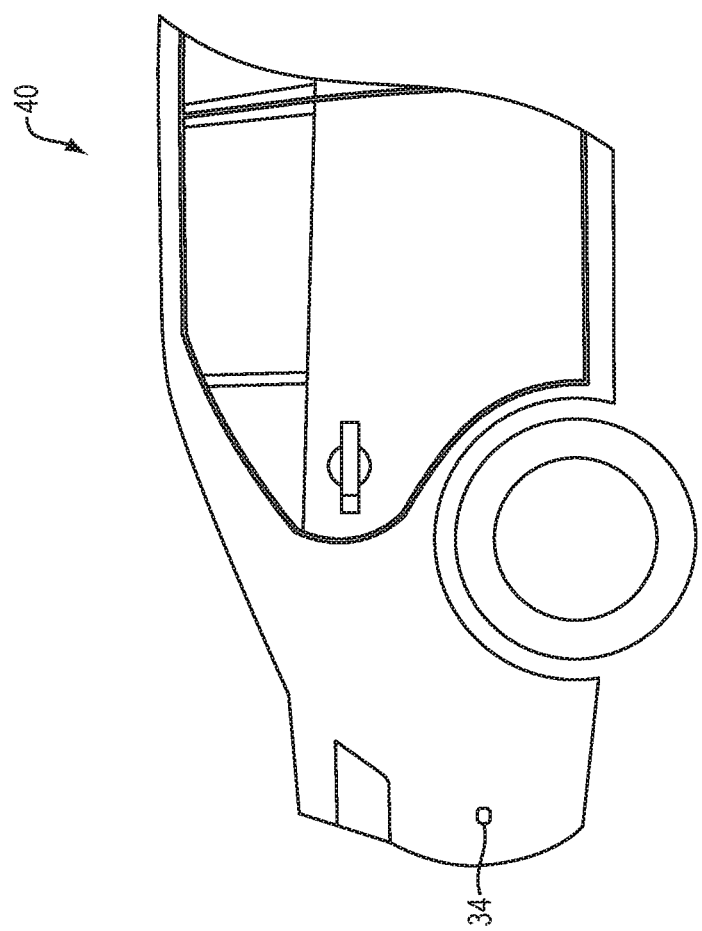
FIG. 5 shows a side view of a trunk section of a vehicle with cell phone use lights positioned on a side back quarter panel according to another embodiment of the disclosure.
Figure 6:
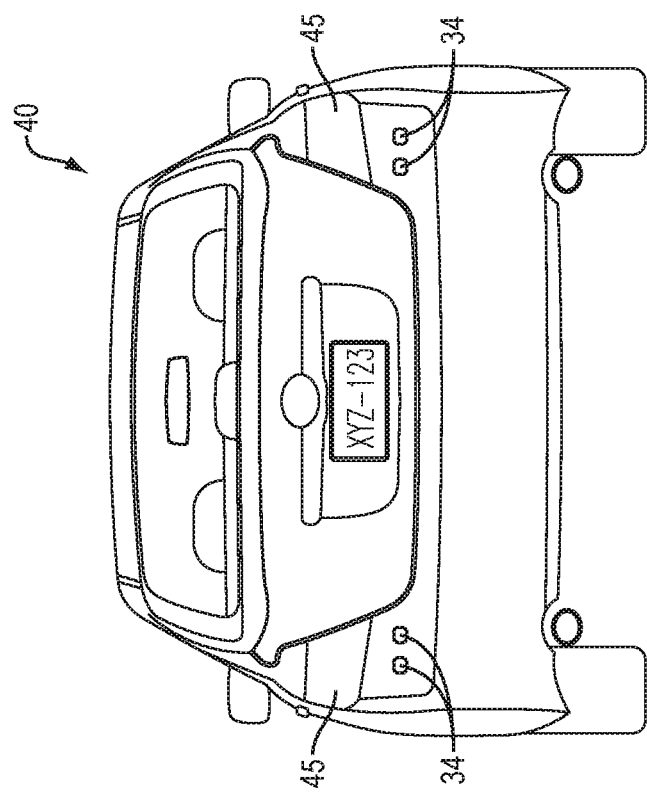
FIG. 6 shows a trunk portion of a vehicle with cell phone use lights according to yet another embodiment of the disclosure.
Figure 6A:
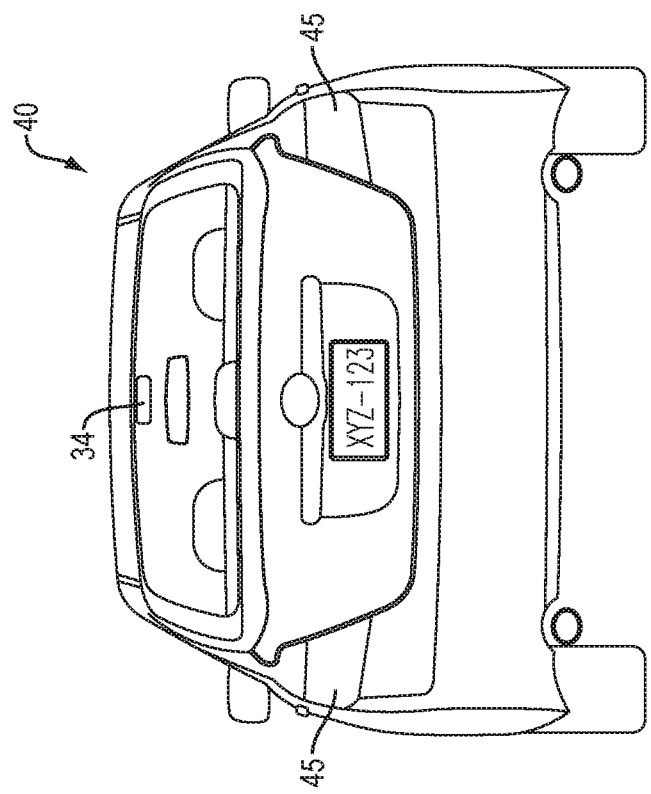
FIG. 6A shows a trunk portion of a vehicle with the cell phone use light positioned in the upper field of the rear window according to another embodiment of the disclosure.
Figure 6D:
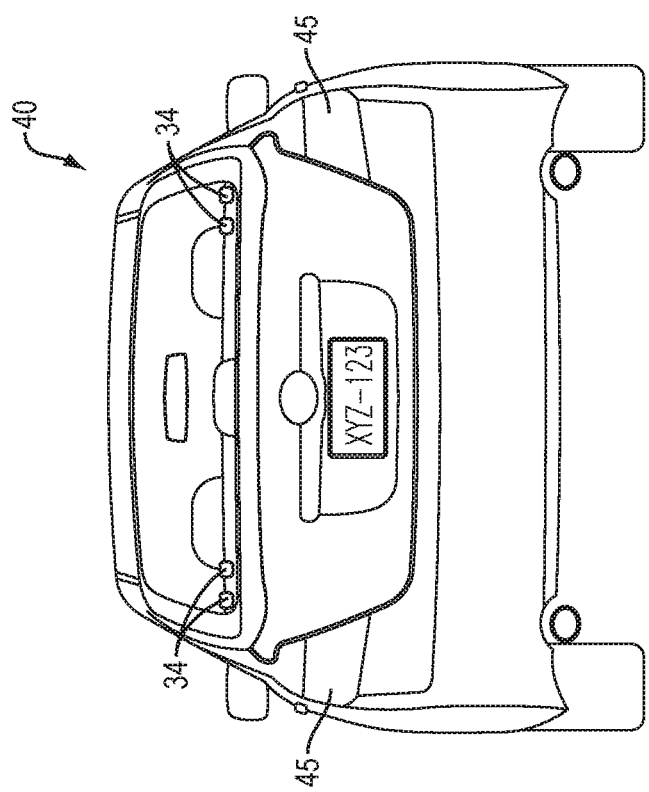
FIG. 6D shows a trunk portion of a vehicle with the cell phone use lights positioned in a lower field of the rear window according to a yet further embodiment of the disclosure.

Referring to FIGS. 4-6D, a vehicle, shown generally as 40, includes one or more exterior cell phone use status lights 34 placed in a variety of locations and arrangements. In FIG. 4, lights 34 are shown affixed to the rear center of the vehicle below a trunk of the vehicle. In FIG. 5, lights 34 are shown affixed to the distal end of a rear quarter panel of vehicle 40. In FIG. 6, lights 34 are separated into two sets, a right and a left set, to correspond to the seat locations being referenced by the lights. In FIG. 6A, light 34 is positioned in the field of the rear window and can be configured to flash simultaneously inside and outside the vehicle, as shown in FIG. 6B, to provide internal and external notification of cell phone use status. In FIG. 6C, lights 34 are positioned above the trunk lid and separated into two sets, a right and a left set, to correspond to the seat location being referenced by the lights. In FIG. 6D, lights 34 are positioned similarly to those in FIG. 6C, except the sets are situated in the lower field of the rear window.

It should be understood and apparent that light configurations shown are for illustrative purposes only and that any combination of light configurations may be possible, including redundant sets placed on the rear, sides and/or front of vehicle 40 so as to allow cell phone use monitoring to take place from a variety of viewing angles from the exterior of the vehicle. It should also be understood and apparent that lights 34 may be any of a variety of types including incandescent, halogen, ultraviolet, infrared, LED and the like.

As a further alternative, lights 34 may be integrated into existing exterior light assemblies as shown in FIG. 11. Exterior light assembly 45 includes headlights, brake light 46, reverse light 48, and parking light 50. Lights 34 may be further modified to function as strobe or flashing lights to make more conspicuous and improve visibility when a cell phone is being used unlawfully. To further differentiate lights 34 from other vehicle lights, lights 34 may be colored with a color selected to be different from the colors used for other vehicle lights like red for brake lights, or emergency lights, such as blue used on law enforcement vehicles. Color schemes may also be implemented to signify voice versus text use. For example, a yellow light could designate cell phone texting use while a green light could signify cell phone voice call use.

In an alternative embodiment, two exterior lights can be assigned to each seat with each pair of lights used to distinguish between voice calls and texting. For example, a red light can be used and activated to indicate texting events and a blue light can be used and activated to indicate cell phone voice call activity. This use of light pairs can be implemented with any of the light configurations disclosed herein.

For vehicles with Bluetooth connectivity, the detection system can have a modified set of light configurations to distinguish between use of Bluetooth and direct cell tower use. In one embodiment, the detection of a cell phone being used for a voice call with the use of Bluetooth connectivity will activate a specific light or light color to designate a voice call with Bluetooth implementation. A detected voice call without blue-tooth Bluetooth implementation will activate the same or different light or light color to designate a voice call without Bluetooth. The detection of a cell phone being used for a texting event with Bluetooth will activate the same or a different light and/or a different color to designate texting with Bluetooth. Detection of cell phone use for texting without Bluetooth will activate the same or different light and/or a different color to designate texting without Bluetooth. No light activation can also be an alternative means to identify Bluetooth implementation.

It should be understood that any combination of light activations/deactivations and color schemes may be developed or standardized to designate the different cell phone uses with or without blue tooth implementation. Light activation for any of the functions disclosed herein may also be set to remain activated for a set period of time, e.g., illustratively, 60 seconds, after termination of the detected event, to permit law enforcement to record the activation during a traffic stop. This function may also be connected to the main vehicle battery, or a back-up battery to ensure function is maintained when the vehicle is in park or stopped.

An additional aspect is to integrate a horn or other sound device, e.g., a speaker, with the external light system to provide an audible approach for external monitoring of cell phone use. Incorporation of a horn 49 is shown in FIG. 16, which corresponds to the system shown in FIG. 2 with the addition of the horn being activated in conjunction with light 34. Incorporation of a horn 49 with the wireless system shown in FIG. 3 is shown in FIG. 17. Again, horn 49 is activated in conjunction with light 34 in this alternate aspect. The sound device, such as horn 49, may emit the sound warning from either inside or outside the motorized vehicle.

In one aspect, the sound device emits repeating intermittent sounds when a cell phone is being used. In another aspect, a continuous sound is emitted while a cell phone is being used in the vehicle. In a further aspect, the sound emitted due to cell phone use may undulate or pulsate in a regular or irregular fashion to attract the attention of the automobile passengers and/or individuals monitoring cell phone use from the exterior. In a still further aspect of the disclosure, different sounds or undulating patterns may be used to distinguish texting from voice calls.

In a further aspect of the disclosure, the cell phone detection system is connected to the vehicle's "black box," i.e., the data recordation system incorporated into most new vehicles that records various data about a vehicle's operation (speed, braking events, etc.) as well as accident events. The cell phone detection system sends detection data to the black box that records and stores the data including the time of the event and the type of event, e.g., voice call or texting event. This can be coordinated with accident data to determine if a cell phone or other electronic device was in use when the accident occurred.

In an alternate aspect shown in FIG. 18, horn 49 is placed in substitution of light 34 of the system shown in FIG. 2. In FIG. 19, horn 49 is placed in substitution of light 34 of the wireless system shown in FIG. 3 so as to be independent of the light system and take the place of the lights in the cell phone monitoring system disclosed herein.

Figure 10:
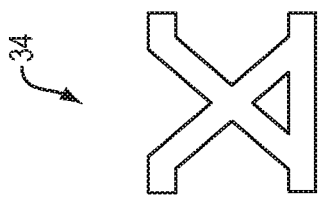
FIG. 10 shows a cell phone use light according to yet another embodiment of the disclosure.
Figure 9:
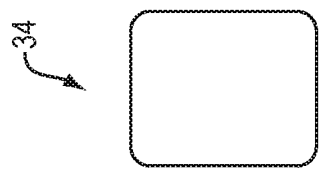
FIG. 9 shows a cell phone use light according to a further embodiment of the disclosure.
Figure 8:
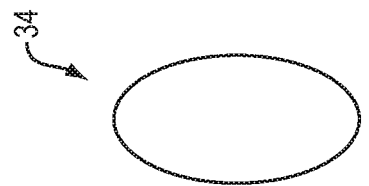
FIG. 8 shows a cell phone use light according to another embodiment of the disclosure.
Figure 7:
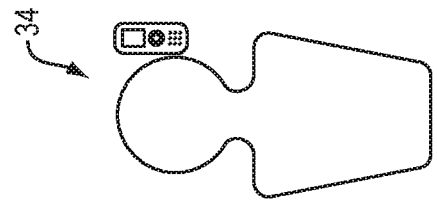
FIG. 7 shows a cell phone use light according to one embodiment of the disclosure.

Referring to FIGS. 7-10, a series of external lights' shapes and configurations are shown. FIG. 7 shows a cell phone use light that mimics a conventional cell phone sign in current use. FIG. 8 shows light 34 in the shape of an oval. FIG. 9 shows light 34 in the shape of a square or rectangle. FIG. 10 shows light 34 in the shape of a modified x. It should be understood and apparent that light 34 may be configured in any regular or irregular geometric shape and may conform to government-regulated shapes and/or sizes.

An additional aspect is to include a RFID device to emit an RF signal that can be detected by an RFID reader to provide cell phone use status information. It is contemplated that the RFID system will mimic that currently in use and known as the EZ-PASS® system used at toll booths for highway usage collections. The RFID device is connected to the central processor/controller and configured so as to send a signal when a cell phone is being used in the vehicle. The signal may be standardized to indicate either voice calls or texting. Radio frequencies emitted may be unique to a specific seat or common to all seats in a vehicle. The RF signals sent may or may not be coordinated with any cell phone monitoring system situated in the interior of the vehicle.

Figure 12:
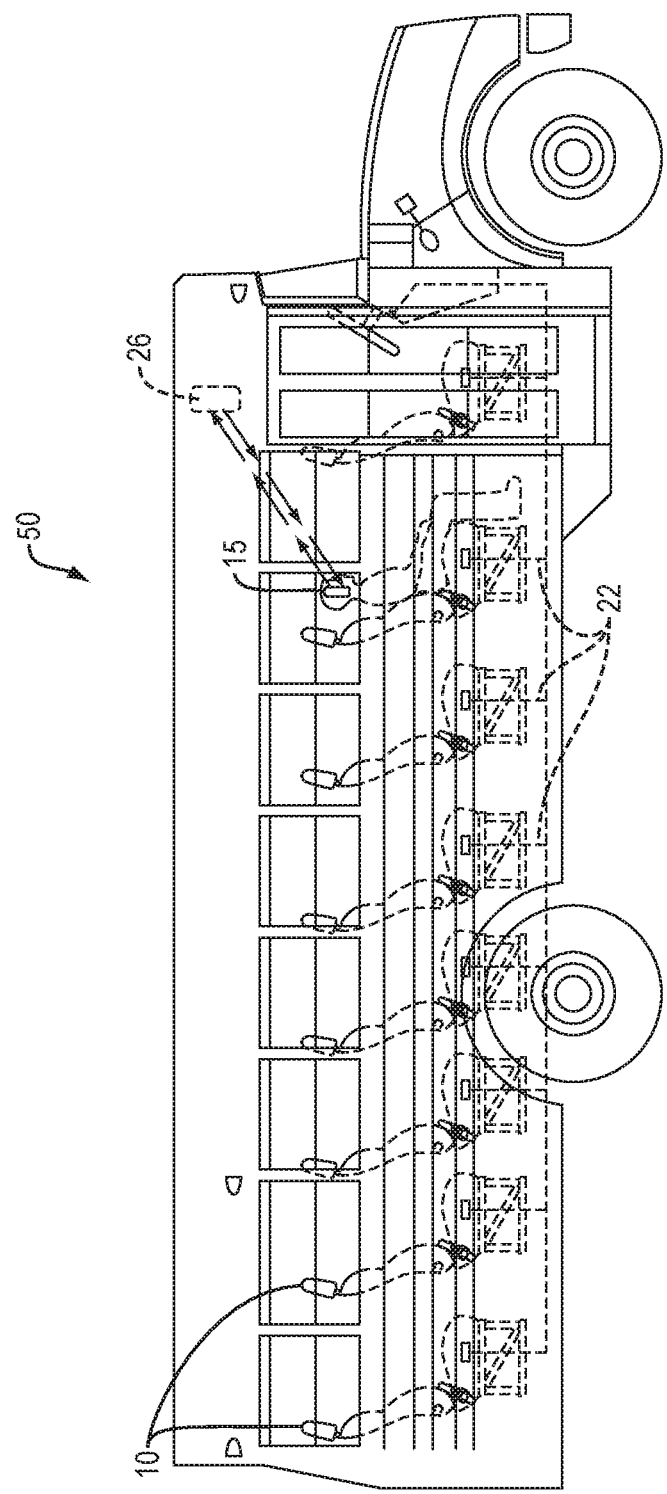
FIG. 12 shows a school bus with seats and cell phone monitoring system in phantom according to an embodiment of the disclosure.

The cell phone use detection system described herein is intended for implementation in any vehicle used to carry passengers including illustratively boats, trains, buses (commercial and school), cars, vans, SUV's and trucks. As shown in FIG. 12, the system can be implemented for internal monitoring, such as in a school bus, shown generally as 50, to ensure children seated in the bus are not using cell phones in violation of any rules or regulations governing buses. Seats 10 include dedicated cell phone use detection sensors 26, or sensors may be placed spaced apart in the bus to permit triangulation procedures to determine the exact seat from which the cell phone use signal is emanating. When a cell phone is in use and detected, signal 32 is sent to a light panel 56 as shown in FIG. 13 by systems such as that shown in FIGS. 2 and 3. Light panel 56 may be integrated into a bus dashboard 54 for ease of reference for the driver. In an alternative embodiment, light panel 56 may be installed as a stand-alone panel, separate from the dashboard.

Light panel 56 includes a light 58 for each seat in the bus. The lights may be arranged to correspond to the arrangement of seats in the bus for ease of reference. A single light 56 may designate a single bench seat, or to segments of a single bench seat. Additionally, each light 58 may have a seat designation assigned to it, which are used in commercial buses, in particular. The interior monitoring system may be used in any vehicle (personal or commercial), watercraft, aircraft and the like.

With respect to commercial passenger aircraft (and equally applicable to private and military aircraft), there is a bona fide need to monitor electronic device usage, particularly during take-off and landing when multiple electronic systems are employed to safely and successfully take-off and land. To avoid any interference from passenger electronic device use (deliberate or unintentional), the disclosure can be employed in aircraft seats, or aircraft cabins, and either hardwired or wirelessly connected to a common panel (in accordance with the various options described above in connection with motor vehicle systems) with each seat assigned a dedicated light as shown in FIGS. 14 and 15.

Referring to FIG. 14, aircraft cabin 60 includes a plurality of seats 10 each with a dedicated seat status sensor 30 (force or heat sensor) that transmits a signal 32 to an electronic device use monitor panel 62. Signal 32 may be sent via hardwire connection or wirelessly in the same manner as hereinbefore described for the vehicle seat. At least two electronic device sensors 33 are positioned in the cabin spaced apart to permit the requisite triangulation function to pinpoint electronic device use. In an alternative embodiment, each seat may have a dedicated sensor 33. In a further alternate embodiment, a single sensor 33 is positioned in an asymmetric location in the aircraft to detect unique three dimensional locations throughout the entire passenger cabin.

Referring to FIG. 15, panel 62, in one embodiment, includes a plurality of lights 34 that correspond to each seat in the aircraft. Optionally, an alpha-numeric designation 64 is assigned each light 34 to represent the correspondingly assigned seat designation as is common with passenger aircraft. In this manner, aircraft personnel may identify passengers not in compliance with the current electronic device use requirement and seek compliance with the aircraft's PA system or one-on-one instruction. In an alternative embodiment, a single light 34 connected to all the seat use sensors and electronic device sensors in the aircraft indicates group compliance or lack of compliance based on the compliance status of each individual user. If one user has not properly shut off their electronic device(s), light 34 will be activated (or deactivated if deactivation signifies improper use).

The system may further be connected to an aircraft's "black box," shown generally as 66 in FIG. 14, to make a permanent record of electronic device use during the course of a flight. In addition to lights, a bell tone device or other audible device can be installed in the common panel to provide an audible alert in the event the panel cannot be visually inspected at any given time. The panel can be placed in any location in an aircraft including the cockpit and flight attendant seating areas.

In a still further aspect, light or audible devices (such as bell tones and buzzers), dedicated to a single seat are placed in the ceiling above the seat or at some other location adjacent to the seat to provide localized notification of unpermitted electronic device usage. The electronic device sensing systems are the same as those described herein except that the notification light(s)/audible device(s) are situated in close proximity to the seat in question. The same or similarly dedicated lights or audible devices can also be placed in the ceiling above or at some other location adjacent to a particular seat to provide localized notification of electronic device use status. The lights may flash or maintain relatively constant intensity to alert the seat user of the need to shut off electronic devices. The lights and audible devices also provide an attendant with localized information of electronic device use status. The localized lights and/or audible devices may be coordinated with or independent of the console lights and/or audible devices.

The system described herein provides a way to monitor electronic device use from the exterior of a vehicle (or internally in the case of a commercial passenger aircraft as shown in FIGS. 13-15), regardless of the type of vehicle within which the system is implemented. When a person sits in a vehicle seat, signals are emitted from sensors in the seat and sent to a controller for processing. Cell phone or electronic device use sensors also sends signals to the controller for processing when cell phone use is detected. If no cell phone use is detected, no signal is sent to the controller.

Alternatively, the system can be programmed to have the sensor send a signal when no cell phone use is detected. The controller processes the signals and determines whether there is any cell phone use, voice or text. If proper use is determined (or non-use), a signal is emitted by controller 24 to activate external light 34, which, in this embodiment, signifies proper cell phone non-use. Should a seat be occupied and cell phone use detected, the signals sent to controller 24 are processed to determine improper cell phone use and a corresponding signal is not emitted by controller 24 to activate external light 34, which, in this example, signifies improper use.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patents is:

1. An apparatus for externally monitoring cell phone use in a vehicle cabin comprising:
    a vehicle having a passenger cabin;
    a cell phone use detection system secured in the vehicle and having at least two cell phone use detection sensors secured in separate positions in the vehicle cabin, wherein the at least two detection sensors detect the frequency of radio waves emitted by cell phones;
    at least one cell phone use indication light positioned on the exterior of the vehicle and connected to the cell phone use detection system, wherein the at least one indication light is activated by the cell phone use detection system, when cell phone use is detected, in a predetermined lighting and/or color selection, the lighting and/or color selection of which indicates either use of a cell phone for a voice call, or cell phone use for text messaging; and,
    at least one vehicle seat secured in the passenger cabin, a vehicle seat occupancy detection sensor positioned inside the at least one seat, and a seat use monitoring system secured in the vehicle, wherein the occupancy detection sensor relays a signal to the seat use monitoring system when an individual occupies the at least one seat, wherein the seat use monitoring system is connected to the cell phone use detection system, and wherein the at least one indication light is activated when the at least two cell phone use detection sensors detect radio waves emitted from at least one cell phone and the seat use monitoring system detects an individual occupying the at least one seat.

2. The apparatus of claim 1 further comprising a plurality of seats in the vehicle, wherein each seat has a seat occupancy detection sensor, wherein the cell phone use detection system has a 3-dimensional volume or cubicle assigned to each of the plurality of seats, wherein the cell phone use detection system processes the detected cell phone radio wave frequencies, determines the 3-dimensional location of the radio wave source, determines if the detected radio waves are being emitted from a specific seat's 3-dimensional volume, determines if a voice call or text message is being sent, and determines if the seat associated with the 3-dimensional volume in which the radio waves are detected is occupied, before activating the at least one cell phone use indication light.

3. The apparatus of claim 2 further comprising a black box secured in the vehicle, wherein cell phone use detected by the cell phone use detection system is recorded by the black box.

4. The apparatus of claim 3 further comprising a plurality of cell phone use indication lights, wherein each light is dedicated to one of the plurality of seats.

5. The apparatus of claim 4 wherein the plurality of lights are arranged on the exterior of the vehicle in an arrangement substantially similar to the arrangement of the plurality of seats.

6. The apparatus of claim 2 wherein the cell phone use detection system further comprises a controller, wherein the at least two cell phone detection sensors send signals to the controller, wherein the controller processes the signal to determine status of cell phone use.

7. The apparatus of claim 6 wherein the controller sends a signal to the indication light after processing the signal received from the at least two cell phone use sensors.

8. The apparatus of claim 2 further comprising a Bluetooth-based transceiver secured in the vehicle, wherein the cell phone use detection system detects whether the transceiver is in use when the cell phone use is detected.

9. The apparatus of claim 8 wherein the cell phone use detection system detects a voice call and does not activate the cell phone use indication light when the cell phone use detection system detects the Bluetooth-based transceiver is in use.

10. The apparatus of claim 8 wherein the cell phone use detection system detects a text message being sent and activates the cell phone indication light whether or not the cell phone use detection system detects the Bluetooth-based transceiver in use.

11. The apparatus of claim 2 wherein the vehicle further comprises a gear selector having a park position, wherein the cell phone use detection system further detects whether the gear selector is in park and/or whether the vehicle is stopped, wherein if the vehicle gear selector is in park, or the vehicle is stopped, the cell phone use detection system does not activate the cell phone use indication light.

12. The apparatus of claim 1 wherein the cell phone use detection sensors are wirelessly connected to the indication light.

13. The apparatus of claim 12 further comprising a controller connected wirelessly to the cell phone use detection sensors via Bluetooth, RF or other wireless protocol, wherein the controller is further wirelessly connected to the indication light, wherein the sensors each include a transmitter, and wherein at least one of the transmitters sends a wireless signal to the indication light via the controller when the corresponding sensor is triggered by cell phone activity.

14. The apparatus of claim 13 wherein the transmitter is a tuned circuit that transmits a wireless signal at one or more selected frequencies.

15. The apparatus of claim 12 wherein the vehicle comprises a plurality of seats each with a cell phone use detection sensor.

16. The apparatus of claim 15 wherein each sensor transmits a wireless signal at a frequency different from the other sensors to the cell phone use detection system.

17. The apparatus of claim 1 wherein the vehicle further comprises a fully automated vehicle that can be switched between a fully automated mode and a driver-assisted mode, wherein the vehicle further comprises an automated vehicle indicator light secured on the exterior of the vehicle, wherein the automated vehicle indicator light is either activated or deactivated when the vehicle is in the fully automated mode.

18. The apparatus of claim 1 wherein the cell phone use indication light remains activated for a set period of time after cell phone use has terminated and the vehicle is in a park, or stopped.

19. An apparatus for externally monitoring cell phone use in a vehicle cabin comprising:
a vehicle having a passenger cabin;
a cell phone use detection system secured in the vehicle and having at least two cell phone use detection sensors secured in separate positions in the vehicle cabin, wherein the at least two detection sensors detect the frequency of radio waves emitted by cell phones;
at least one cell phone use indication light positioned on the exterior of the vehicle and connected to the cell phone use detection system, wherein the at least one indication light is deactivated by the cell phone use detection system when cell phone use is detected, wherein the deactivation of the at least one indication light indicates either use of a cell phone for a voice call, or cell phone use for text messaging; and,
at least one vehicle seat secured in the passenger cabin, a vehicle seat occupancy detection sensor positioned inside the at least one seat, and a seat use monitoring system secured in the vehicle, wherein the occupancy detection sensor relays a signal to the seat use monitoring system when an individual occupies the at least one seat, wherein the seat use monitoring system is connected to the cell phone use detection system, and wherein the at least one indication light is deactivated when the at least two cell phone use detection sensors detect radio waves emitted from at least one cell phone and the seat use monitoring system detects an individual occupying the at least one seat.

20. An apparatus for externally monitoring cell phone use in a vehicle cabin comprising:
a vehicle having a passenger cabin;
a cell phone use detection system secured in the vehicle and having one cell phone use sensor secured in the vehicle cabin, wherein the cell phone use detection sensor detects the frequency of radio waves emitted by cell phones;
at least one cell phone use indication light positioned on the exterior of the vehicle and connected to the cell phone use detection system, wherein the at least one indication light is activated by the cell phone use detection system, when cell phone use is detected, in a predetermined lighting and/or color selection, the lighting and/or color selection of which indicates either use of a cell phone for a voice call, or cell phone use for text messaging; and,
at least one vehicle seat secured in the passenger cabin, a vehicle seat occupancy detection sensor positioned inside the at least one seat, and a seat use monitoring system secured in the vehicle, wherein the occupancy detection sensor relays a signal to the seat use monitoring system when an individual occupies the at least one seat, wherein the seat use monitoring system is connected to the cell phone use detection system, and wherein the at least one indication light is activated when the cell phone use detection sensor detects radio waves emitted from at least one cell phone and the seat use monitoring system detects an individual occupying the at least one seat.

21. The apparatus of claim 20 further comprising a plurality of seats in the vehicle, wherein each seat has a seat occupancy detection sensor, wherein the cell phone use detection system has a 3-dimensional volume or cubicle assigned to each of the plurality of seats, wherein the cell phone use detection system processes the detected cell phone radio wave frequencies, determines the 3-dimensional location of the radio wave source, determines if the detected radio waves are being emitted from a specific seat's 3-dimensional volume, determines if a voice call or text message is being sent, and determines if the seat associated with the 3-dimensional volume in which the radio waves are detected is occupied, before activating the at least one cell phone use indication light.

22. The apparatus of claim 20 wherein the vehicle further comprises a fully automated vehicle that can be switched between a fully automated mode and a driver-assisted mode, wherein the vehicle further comprises an automated vehicle indicator light secured on the exterior of the vehicle, wherein the automated vehicle indicator light is either activated or deactivated when the vehicle is in the fully automated mode.

23. The apparatus of claim 20 further comprising a Bluetooth-based transceiver secured in the vehicle, wherein the cell phone use detection system detects whether the transceiver is in use when the cell phone use is detected.

24. The apparatus of claim 23 wherein the cell phone use detection system detects a voice call and does not activate the cell phone use indication light when the cell phone use detection system detects the transceiver is in use.

25. The apparatus of claim 23 wherein the cell phone use detection system detects a text message being sent and activates the cell phone indication light whether or not the cell phone use detection system detects the transceiver in use.

\* \* \* \* \*